United States Patent
Akenine-Möller

(10) Patent No.: US 12,462,466 B2
(45) Date of Patent: Nov. 4, 2025

(54) AVERAGE RATE REGULATOR FOR PARALLEL ADAPTIVE SAMPLER

(71) Applicant: NVIDIA Corp., Santa Clara, CA (US)

(72) Inventor: Tomas Guy Akenine-Möller, Lund (SE)

(73) Assignee: NVIDIA Corp., Santa Clara, CA (US)

( * ) Notice: Subject to any disclaimer, the term of this patent is extended or adjusted under 35 U.S.C. 154(b) by 176 days.

(21) Appl. No.: 18/527,750

(22) Filed: Dec. 4, 2023

(65) Prior Publication Data
US 2025/0182378 A1    Jun. 5, 2025

(51) Int. Cl.
*G06T 15/06* (2011.01)

(52) U.S. Cl.
CPC .......... *G06T 15/06* (2013.01); *G06T 2210/52* (2013.01)

(58) Field of Classification Search
CPC .... G06T 15/06; G06T 2210/52; G06T 15/005
See application file for complete search history.

(56) References Cited

U.S. PATENT DOCUMENTS

| | | | |
|---|---|---|---|
| 10,992,845 B1 * | 4/2021 | Seely | H04N 5/2226 |
| 11,216,916 B1 * | 1/2022 | Kozlowski | G06T 7/20 |
| 11,282,258 B1 * | 3/2022 | Akenine-Möller | G06T 15/005 |
| 2015/0186987 A1 * | 7/2015 | Madhuranath | G06Q 30/0643 705/27.2 |
| 2020/0027260 A1 * | 1/2020 | Harris | G06T 11/00 |
| 2020/0058105 A1 * | 2/2020 | Liu | G06T 5/40 |

\* cited by examiner

*Primary Examiner* — Kee M Tung
*Assistant Examiner* — Nauman U Ahmad
(74) *Attorney, Agent, or Firm* — Carnelian Law, LLC

(57) ABSTRACT

A ray tracing method forms a first accumulation of importance values of non-clamped pixels in an image and forms a second accumulation of waste importance of clamped pixels in the image. The first accumulation and the second accumulation are applied to set an updated average sample count for pixels in the image, and the ray tracer generates a number of sampling rays for particular pixels by applying the updated average sample count to a per-pixel importance setting.

20 Claims, 13 Drawing Sheets

AVERAGE RATE REGULATOR FOR PARALLEL ADAPTIVE SAMPLER

BACKGROUND

Ray-tracing is a mechanisms utilized in computing systems and devices to render images by projecting a virtual light ray from a viewpoint and simulating the effects of the light's encounters with virtual objects. Ray-tracers may be applied to simulate a variety of optical effects such as shadows, reflections and refractions, scattering phenomenon, and dispersion phenomenon (such as chromatic aberration).

In order for the final render to accurately portray lighting conditions in the virtual environment, ray tracers may generate a large number of samples for each pixel. Due to the large number of samples, the computational resources used for rendering the virtual environment may be configured such that the sampling does not impose too great of a delay for real-time rendering applications, such as gaming.

High resolution graphics applications, such as those utilizing real-time ray tracers, may apply adaptive mechanisms to more efficiently sample pixels in an image. Adaptive mechanisms adjust the number of samples on a per-pixel basis for different frames to render. Adaptive ray tracers may be configured with a maximum number of samples to apply per any given pixel. If the sampler determines that a pixel should be sampled more times than the configured maximum, the number of samples allocated to the pixel is clamped at the configured maximum. This may lead to waste of the per-frame sampling budget and/or variations in the rendered frame rate.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
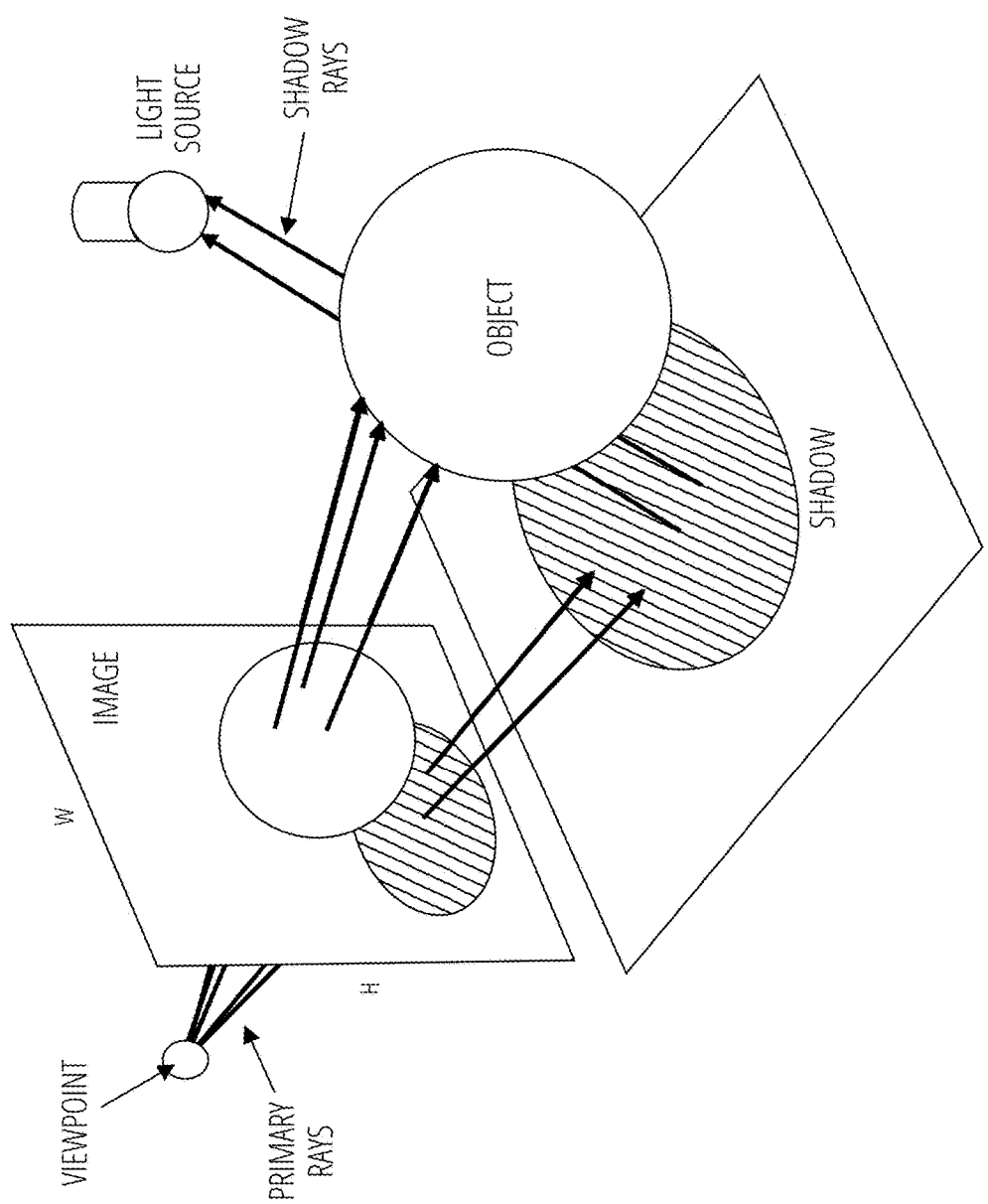
FIG. 1 illustrates an aspect of the subject matter in accordance with one embodiment.

Embodiments of adaptive image sampling mechanisms are disclosed that more efficiently distribute a pixel sampling budget across the image. In one aspect, an unused (waste) sample budget arising from the clamping of sampling on some pixels is distributed over pixels in an image where the sampling is not clamped.

An adaptive sampling ray tracing engine may configure a minimum number of samples per pixel (SPP), l, and a desired average number of SPP, d. An importance determination algorithm is applied that generates a two-dimensional importance (or density) map, wherein each entry in the importance matrix is an indication of a pixel's relative impact or importance to generating the desired rendered frame. The importance map is applied by the ray tracing engine to distribute an integer number of samples per pixel across the image to render, such that both of the l and d constraints (on average) are satisfied. The setting d is typically a floating-point value. The total sampling budget for the image is $\lfloor d \times w \times h \rfloor$ samples, where w and h are the width and height dimensions of the image, respectively.

As an example, setting d=5.25 SPP indicates that on average, each pixel in the image should receive 5.25 samples by the ray tracing engine. Because the setting d is an average, some pixels may be sampled fewer times than the average, while others may be sampled more than the average number of times, perhaps many more times. A real-time ray tracing engine may operate with a configured limit u on the number of samples that any one pixel may receive.

Pixels determined to have high importance to the desired rendering may be assigned sample counts in excess of a configured maximum sample count, u. For example, if the sampler calculates that a pixel should receive 32 samples, but the configured maximum sample count u=8, then that pixel's sampling will be clamped to 8 samples. The "excess" samples (in this case, 32−8=24) are not used, resulting in a deviation from d, the average SPP.

A lower average SPP may result, and if sampling of a substantial percentage of the pixels in an image are clamped in this manner, the frame may be rendered in a substantially lower time compared to if the configured average samples per pixel d were satisfied. The rendered image quality may suffer and the computational power of the processors executing the ray tracing engine are underutilized. Improvements may be obtained by distributing among other pixels those samples that were forgone due to clamping. Some clamping of pixel samples may still occur after the redistribution, but the average sampling rate obtained may be closer to d than otherwise. Subject to available computational power, the redistributions may be performed iteratively to obtain SPPs closer and closer to the desired rate d.

Mechanisms are disclosed to set the sampling count for pixels in an image, given a configuration comprising:

M, an importance map with a floating-point number per pixel;
l, a minimum SPP;
d, a desired average SPP; and
u, a maximum SPP.

From these parameters the mechanisms determine a matrix n(x, y) comprising an integer sample count for each pixel in an image, and further redistribute the excess unused sampling budget that arises from pixels clamped to u.

There are numerous industrial applications of the disclosed mechanisms including but not limited to computer gaming, virtual reality, and vehicular displays.

FIG. 1 depicts an example of ray tracing. A ray tracer generates primary rays from a viewpoint through an image plane to objects in a virtual environment. The virtual environment includes a light source, virtual objects, and virtual surfaces where the virtual objects may cast shadows. An image is constructed on the image plane by setting pixel colors according to where the primary rays land on virtual objects, the light source, and potentially other factors in the environment. The ray tracer may also generate rays from virtual surfaces and virtual objects toward the light source-rays that are obstructed indicate the presence of shadows on the surface or object from which they originate.

Figure 2:
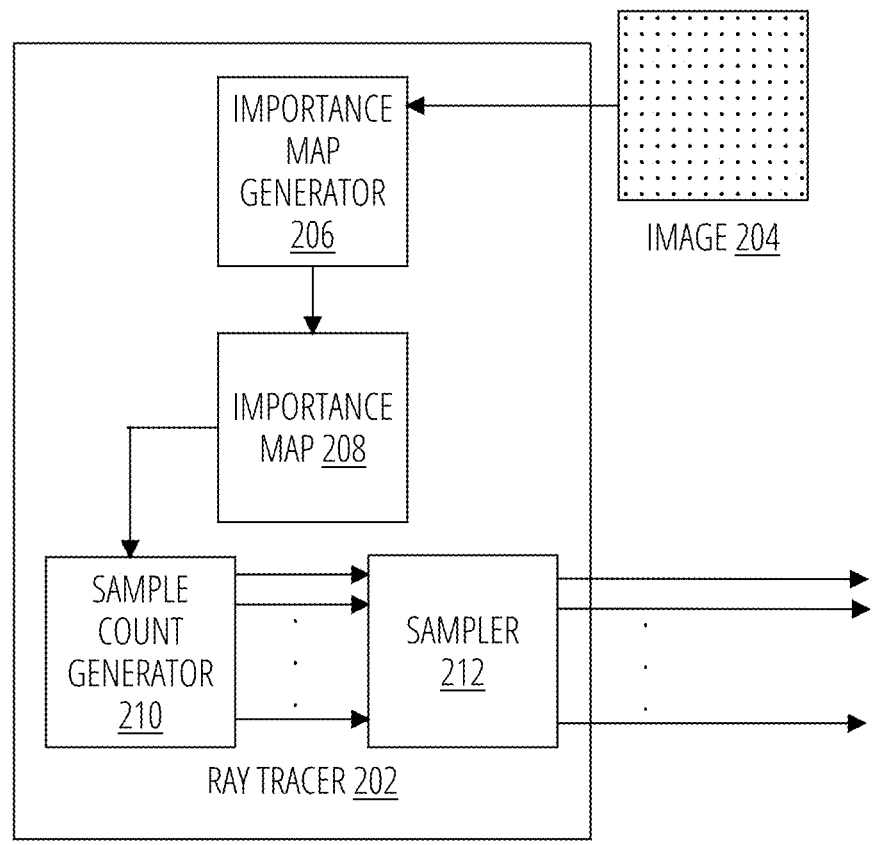
FIG. 2 illustrates an aspect of the subject matter in accordance with one embodiment.

FIG. 2 depicts a ray tracer 202 in one embodiment. The ray tracer 202 processes an image 204 through an importance map generator 206 to generate an importance map 208, wherein the values are indicative of the importance of pixels in the image to the desired quality of the rendered frame. The values in the importance map 208 are input to a sample count generator 210 which transforms the importance values into per-pixel sample counts for the sampler 212. The sampler 212 may for example be a ray trace generator that produces eye-location originating rays, shadow rays, reflection rays, and so on.

Figure 3:
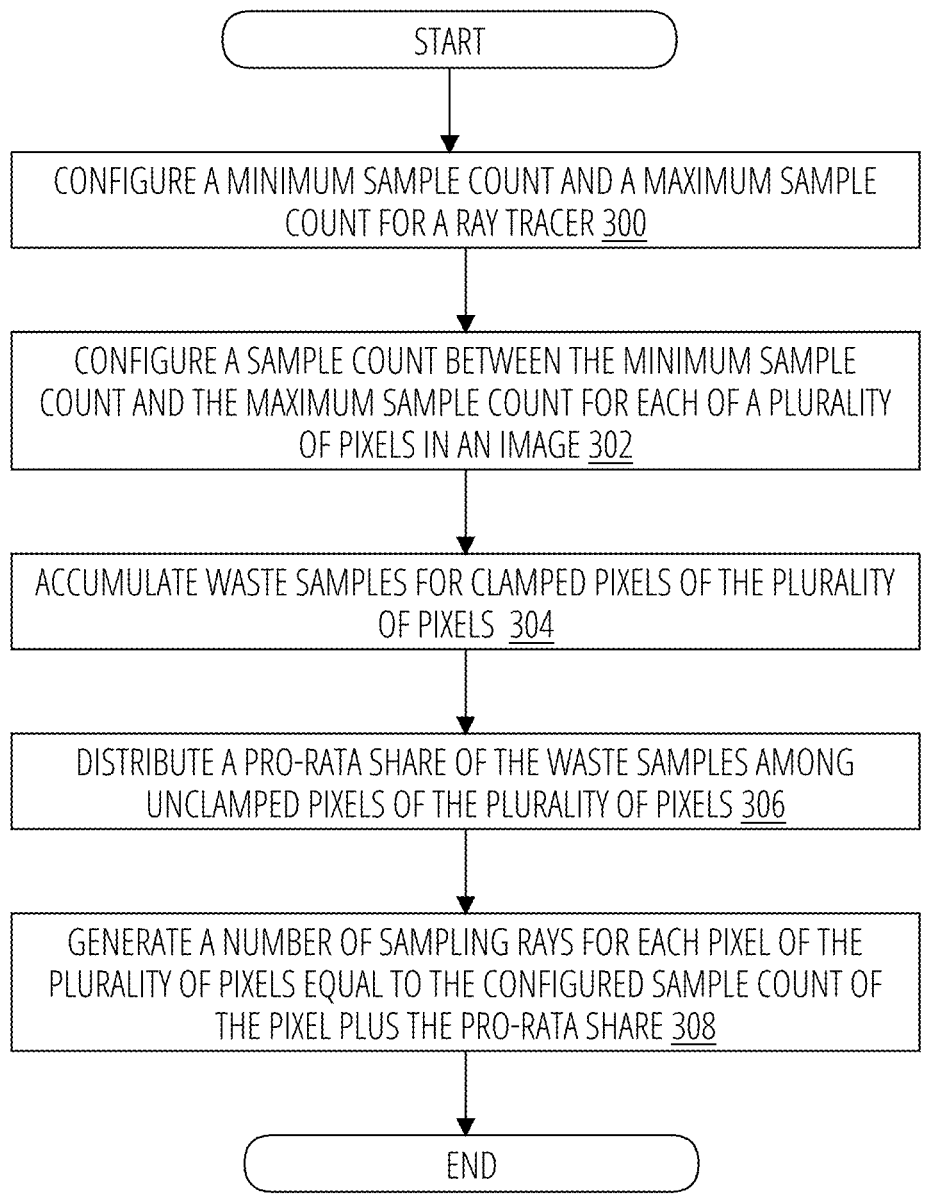
FIG. 3 depicts an adaptive pixel sampling process in one embodiment.

FIG. 3 depicts an adaptive pixel sampling process in one embodiment. The following description assumes a two-dimensional rectangular pixelated image or surface (such as depicted in FIG. 1), and thus sets the total pixel count to sample as wh (width times height, the area of a rectangle). However, the disclosed mechanisms are more generally applicable to images/surfaces of any shape in two, three, or more (virtual) dimensions, with appropriate computation of total pixel count.

In the embodiment of FIG. 3, a minimum sample count and a maximum sample count are configured for a ray tracer (block 300). A sample count between the minimum sample count and the maximum sample count (inclusive) is configured for each of a plurality of pixels in an image (block 302). Waste samples are accumulated for clamped pixels of the plurality of pixels (block 304) and a pro-rata (proportional) share of the waste samples is distributed to non-clamped pixels of the plurality of pixels (block 306). The ray tracer generates a number of samples for each pixel of the plurality of pixels equal to the configured sample count of the pixel plus the pro-rata share (block 308).

The total sampling budget for an (rectangular) image may be expressed as (total pixels in image: wh)×(average SPP: d). The total sampling budget for an image may also be expressed as (samples spent on clamped pixels: $n_c$)+ (samples spent on non-clamped pixels: $n_{uc}$). Therefor, for a rectangular image, whd=$n_c$+$n_{uc}$. If u represents a configured maximum number of per-pixel samples, and $k_c$ is the number of pixels for which the determined sample count exceeds u (i.e., the number of pixels that will have their sample count clamped), then $n_c$=$k_c$u. The number of pixels that do not have their sample count clamped (i.e., non-clamped pixels) is thus $k_{uc}$=wh−$k_c$.

A waste or excess sample budget for the clamped pixels in the image may then be determined by $$e_c = \sum_i$$

((non-clamped sample count for clamped pixel i)−u), where i is taken over the set of clamped pixels only.

In one embodiment, the sample count generator 210 adds a pro-rata share of the waste sample budget $e_c$ to the per-pixel sample count of each non-clamped pixel. Each non-clamped pixel is assigned an extra $$\frac{e_c}{k_n}$$

samples (rounded up or down to an integer number, and subject to clamping at u). Clamping of pixels with an adjusted sample count that exceeds u may be randomized (e.g., with blue noise).

Although this algorithm is efficient, it incurs a drawback in that a constant increment is assigned to the sample count of all non-clamped pixels, so that no pixels may receive the minimum configured sample count l, even if that would be optimal to the rendered frame quality or frame rate (except that some pixels may be assigned the minimum configured sample count l after rounding).

Figure 4:
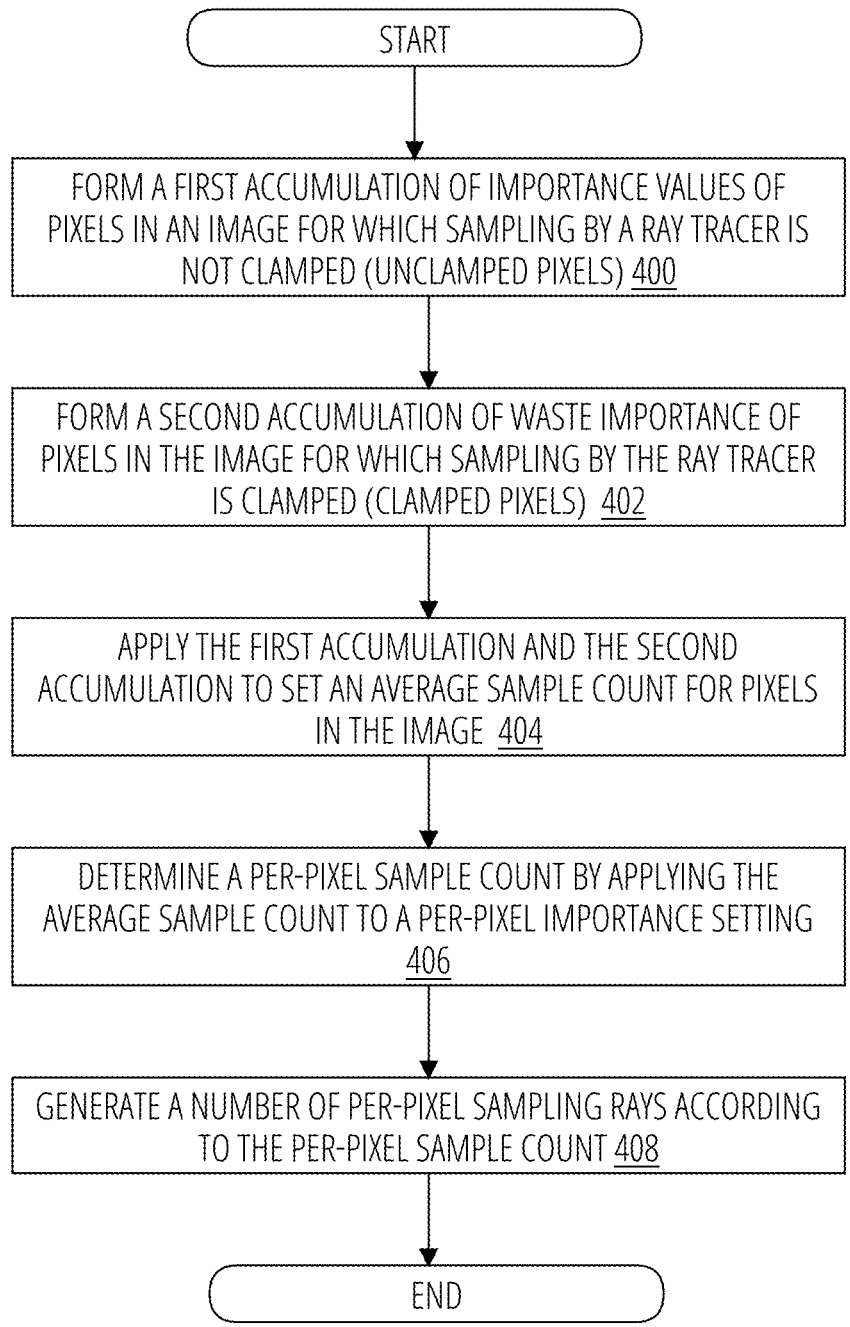
FIG. 4 depicts an adaptive pixel sampling process in another embodiment.

FIG. 4 depicts an adaptive pixel sampling process in another embodiment. In this embodiment, an updated setting of the average samples per pixel (SPP) for the $k_n$ non-clamped pixels is determined, and the waste budget is distributed to satisfy the updated average setting.

At block 400 an accumulation (e.g., sum total) of pixel importance values is formed for pixels in an image for which sampling by a ray tracer is not clamped (non-clamped pixels). In block 402 an accumulation (e.g., sum total) of waste importance is formed for pixels in the image for which sampling by the ray tracer is clamped (clamped pixels). The first accumulation and the second accumulation are applied to set an average sample count for pixels in the image (block 404). A per-pixel sample count is determined by applying the average sample count to a per-pixel importance setting (block 406) and a number of per-pixel sampling rays according to the per-pixel sample count (block 408).

The sum total of pixel importance values may be expressed as: s=Σ (importance map). Let $i_c$ be the importance level, corresponding to a sample count, above which the sampler will clamp the assigned sample count of a pixel. The sum total of pixel importance may be expressed as a sum of the total importance of non-clamped pixels ($s_{uc}$) and the total importance of clamped pixels $s_c$: s=$s_{uc}$+$s_c$, where $$s_c = \sum_{j \in (i > i_c)} i_j \text{ and } s_{uc} = \sum_{j \in (i \le i_c)} i_j.$$

The average pixel importance (assuming a rectangular image) may be expressed as:

$$s_a = \frac{s}{wh}.$$

The importance value at which sampling is clamped may be expressed in terms of this average importance:

$$i_c = \frac{(u-l)}{(d-l)} s_a.$$

The clamping of per-pixel samples at the configured maximum count u leads to wasted sample budget, and this waste may be expressed in terms of a total wasted pixel importance as follows:

$$s_w = \sum_{j \in (i > i_c)} (i_j - i_c).$$

This sum may also be expressed as $$\sum_{j \in (i > i_c)} i_j - i_c k_c.$$

The sum total of all pixel importance may be expressed as the sum of the wasted importance, importance of clamped pixels, and importance of non-clamped pixels as follows: $s = s_w + i_c k_c + s_{uc}$.

An updated average SPP may then be determined by:

$$d_u = \frac{w \cdot h \cdot (d - 1)(s_w + s_{uc})}{s \cdot k_{uc}} + 1 \quad \text{Equation 1}$$

The sample count generator 210 of the ray tracer 202 may generate a sample count ($n_p$) for each pixel in the image, based on the importance of the pixel ($i_p$) and the updated average SPP ($d_u$):

$$n_p = \frac{i_p \cdot (d_u - 1) \cdot k_{uc}}{s_{uc}} + 1 \quad \text{Equation 2}$$

Figure 5A:
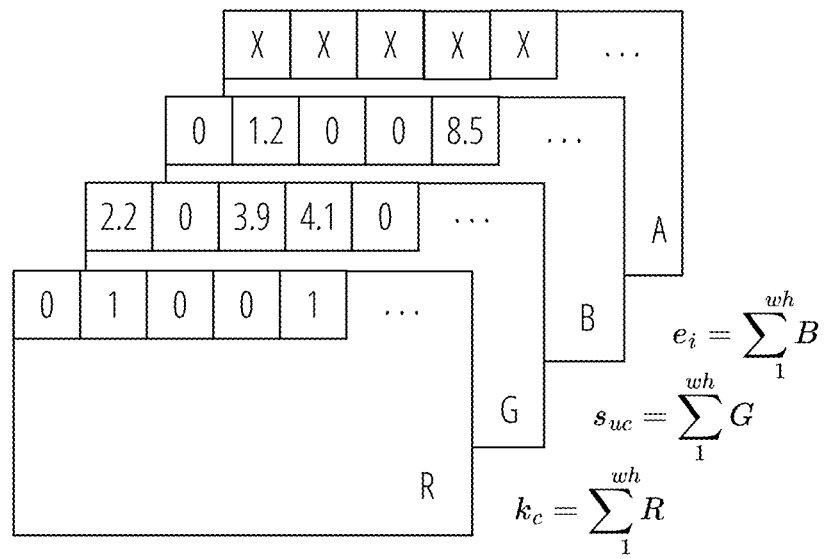
FIG. 5A illustrates an aspect of the subject matter in accordance with one embodiment.
Figure 5B:
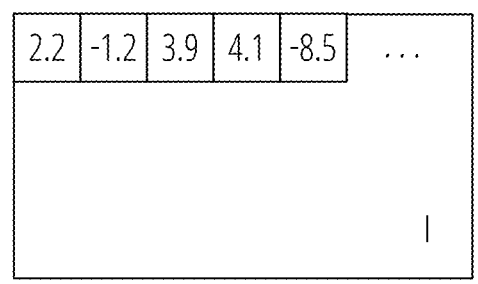
FIG. 5B illustrates an aspect of the subject matter in accordance with one embodiment.

Implementations of the disclosed adaptive sampling techniques may utilize color textures and efficient texture reduction mechanisms to enable high-bandwidth real-time ray tracing. For example, an RGBA (Red-Green-Blue-Alpha) color texture may be configured as follows (see also FIG. 5A):

Components of one texture layer, e.g., Red, are set to a binary value identifying the image pixel at that location as being either clamped (e.g., "0") or not clamped (e.g., "1").

Components of another texture layer, e.g., Green, are set to the importance value for the pixel at that location in the image on condition that the pixel is not clamped; for pixels whose sample count is clamped, this component is set to zero;

Components of another texture layer, e.g., Blue, are set to the waste (excess) importance of the pixel if the pixel is clamped; otherwise, this component is set to zero.

Utilizing the example texture above, the total number of clamped pixels $k_c$ is computed by summing over the Red component. The total importance of non-clamped pixels $s_{uc}$ is computed by summing over the Green component. The total wasted importance $s_w$ is computed by summing over the Blue component. From these sums, the total importance s over the entire image may be computed: $s = s_w + i_c k_c + s_{uc}$. The sample count generator may then utilize Equation 1 and $s_w$, $k_{uc} = wh - k_c$, s, and $s_{uc}$ to determine the adjusted average SPP $d_u$, and may utilize Equation 2 and M, $d_u$ (from Equation 1), $k_{uc}$, and Sue on a per-pixel basis to determine $n_p$, the number of times to sample a given pixel in the image.

In another embodiment, a single-layer (e.g., grayscale) texture may be utilized. To generate the texture:
store $i_p$, the importance of the pixel, on condition that the importance does not correspond to a sample count that exceeds the clamp setting u.
otherwise, store the excess per-clamped pixel importance, with negative sign.

Three output sums may be generated from the values stored in the single element of this texture:
increment a counter $k_{uc}$ (initially set to 0) for every element in the single-layer texture that has its value ≥0.0; then $k_c = wh - k_{uc}$;
generate a sum over all element values that are ≥0.0; this is $s_{uc}$; and
generate a sum over all element values that are <0.0, and flip the sign; this is $s_w$.

Figure 6:
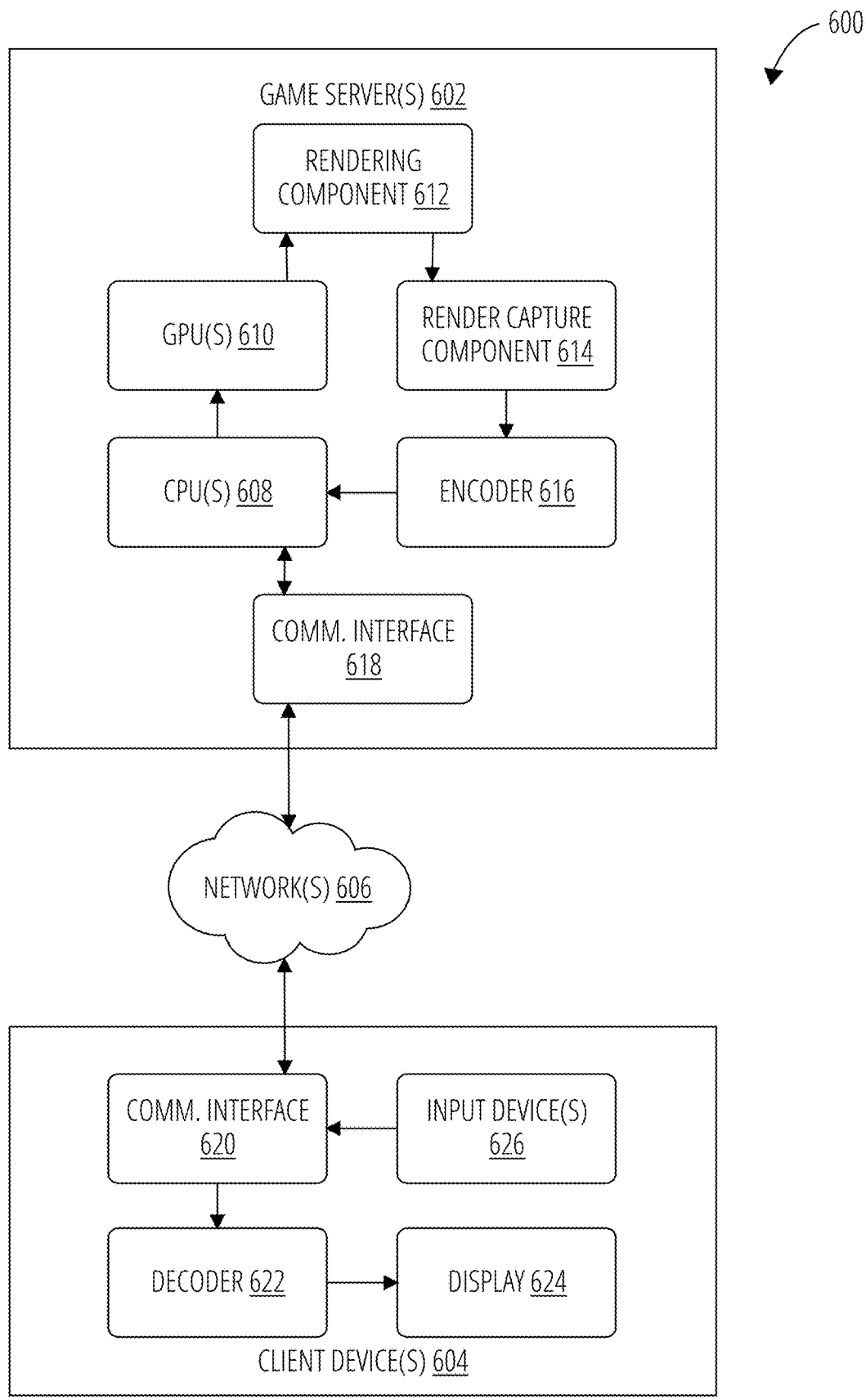
FIG. 6 depicts an example gaming system 600 utilizing embodiments of the disclosed mechanisms.

FIG. 6 is an example system diagram for a gaming system 600, in accordance with some embodiments of the present disclosure. The system comprises one or more game server(s) 602, one or more of which may include components, features, and/or functionality of the computing platforms described in conjunction with the following FIG. 7-FIG. 13.

The game server(s) 602 interact over one or more network(s) 606 with client device(s) 604 that may likewise include such components, features, and/or functionality.

In the gaming system 600, for a game session, the client device(s) 604 may receive input data in response to inputs to the input device(s) 626, transmit the input data to the game server(s) 602, receive display graphics from the game server(s) 602, and display the graphics on the display 624.

The more computationally intense computing and processing may be implemented on the game server(s) 602 (e.g., rendering—in particular ray or path tracing—for graphical output of the game session is executed by the GPU(s) 610 of the game server(s) 602). In other words, the game session may be streamed to the client device(s) 604 from the game server(s) 602, thereby reducing the requirements of the client device(s) 604 for graphics processing and rendering.

For example, a client device 604 may display a frame of the game session on the display 624 upon receiving the rendered frame from the game server(s) 602. The client device 604 may receive an input to one of the input device(s) and generate input data in response. The client device 604 may transmit the input data to the game server(s) 602 via the communication interface 620 and over the network(s) 606 (e.g., the Internet), and the game server(s) 602 may receive the input data via the communication interface 618.

The CPU(s) 608 may receive the input data, process the input data, and transmit data to the GPU(s) 610, causing the GPU(s) 610 to generate a rendering (e.g., by operation of a ray tracer) of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as the GPU(s) 610, which may further employ the use of one or more dedicated hardware accelerators or processing cores to perform ray or path-tracing techniques—of the game server(s) 602. The encoder 616 may then encode the display data to generate encoded display data and the encoded display data may be transmitted to the client device 604 over the network(s) 606 via the communication interface 618. The client device 604 may receive the encoded display data via the communication interface 620 and the decoder 622 may decode the encoded display data to generate the display data. The client device 604 may then display the display data via the display 624.

The ray tracing algorithms and techniques disclosed herein may be executed by computing devices utilizing one or more graphic processing unit (GPU) and/or general purpose data processor (e.g., a 'central processing unit or CPU). Exemplary architectures will now be described that may be configured to carry out the techniques disclosed herein on such devices.

The following description may use certain acronyms and abbreviations as follows:
"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 7:
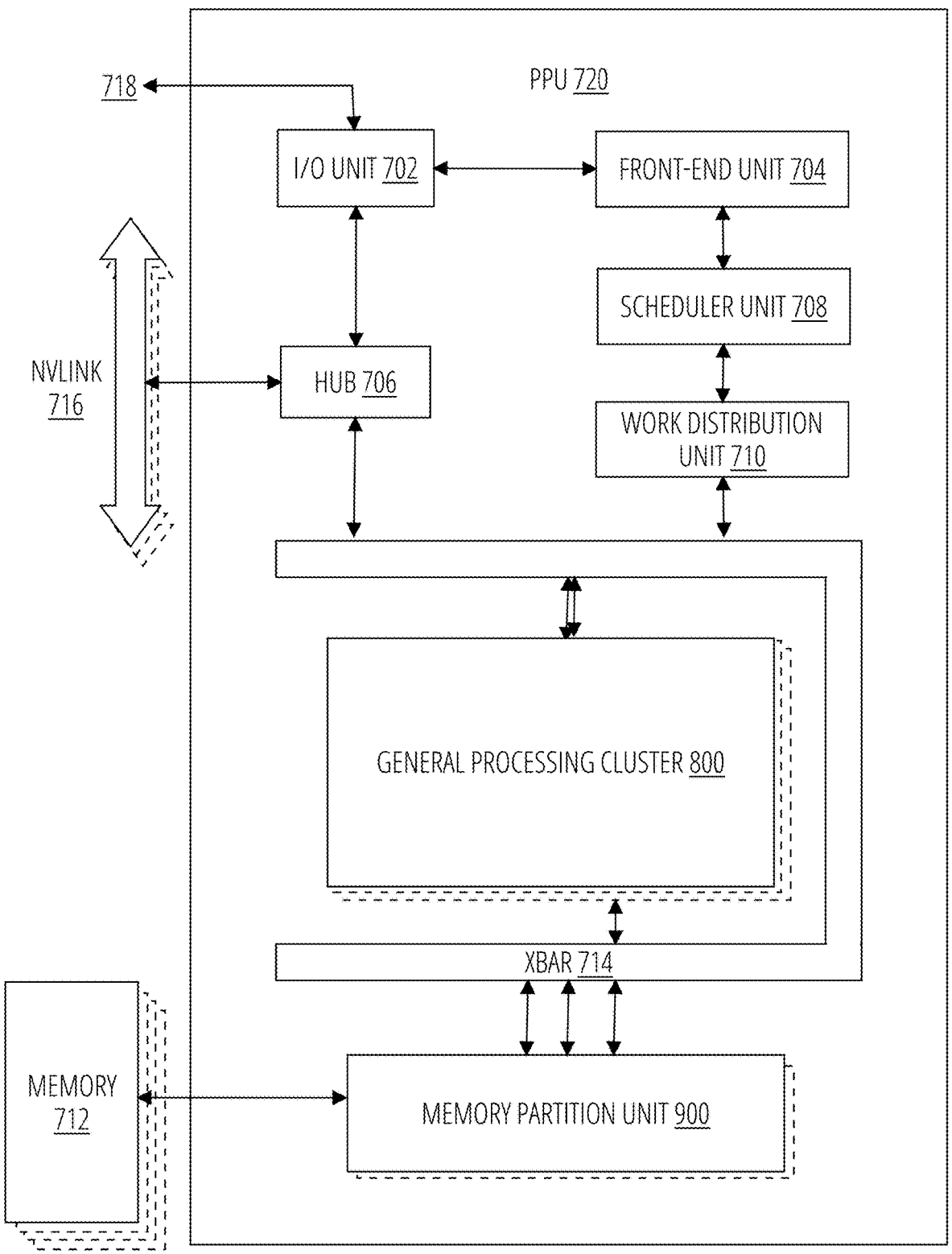
FIG. 7 depicts a parallel processing unit 720 in accordance with one embodiment.

FIG. 7 depicts a parallel processing unit 720, in accordance with an embodiment. In an embodiment, the parallel processing unit 720 is a multi-threaded processor that is implemented on one or more integrated circuit devices. The parallel processing unit 720 is a latency hiding architecture designed to process many threads in parallel. A thread (e.g., a thread of execution) is an instantiation of a set of instructions configured to be executed by the parallel processing unit 720. In an embodiment, the parallel processing unit 720 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 720 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 720 modules may be configured to accelerate thousands of High Performance Computing (HPC), data center, and machine learning applications. The parallel processing unit 720 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 7, the parallel processing unit 720 includes an I/O unit 702, a front-end unit 704, a scheduler unit 708, a work distribution unit 710, a hub 706, a crossbar 714, one or more general processing cluster 800 modules, and one or more memory partition unit 900 modules. The parallel processing unit 720 may be connected to a host processor or other parallel processing unit 720 modules via one or more high-speed NVLink 716 interconnects. The parallel processing unit 720 may be connected to a host processor or other peripheral devices via an interconnect 718. The parallel processing unit 720 may also be connected to a local memory comprising a number of memory 712 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 712 may comprise logic to configure the parallel processing unit 720 to carry out aspects of the techniques disclosed herein.

The NVLink 716 interconnect enables systems to scale and include one or more parallel processing unit 720 modules combined with one or more CPUs, supports cache coherence between the parallel processing unit 720 modules and CPUs, and CPU mastering. Data and/or commands may be transmitted by the NVLink 716 through the hub 706 to/from other units of the parallel processing unit 720 such as one or more copy engines, a video encoder, a video decoder, a power management unit, etc. (not explicitly shown). The NVLink 716 is described in more detail in conjunction with FIG. 11.

The I/O unit 702 is configured to transmit and receive communications (e.g., commands, data, etc.) from a host processor (not shown) over the interconnect 718. The I/O unit 702 may communicate with the host processor directly via the interconnect 718 or through one or more intermediate devices such as a memory bridge. In an embodiment, the I/O unit 702 may communicate with one or more other processors, such as one or more parallel processing unit 720 modules via the interconnect 718. In an embodiment, the I/O unit 702 implements a Peripheral Component Interconnect Express (PCIe) interface for communications over a PCIe bus and the interconnect 718 is a PCIe bus. In alternative embodiments, the I/O unit 702 may implement other types of well-known interfaces for communicating with external devices.

The I/O unit 702 decodes packets received via the interconnect 718. In an embodiment, the packets represent commands configured to cause the parallel processing unit 720 to perform various operations. The I/O unit 702 transmits the decoded commands to various other units of the parallel processing unit 720 as the commands may specify. For example, some commands may be transmitted to the front-end unit 704. Other commands may be transmitted to the hub 706 or other units of the parallel processing unit 720 such as one or more copy engines, a video encoder, a video decoder, a power management unit, etc. (not explicitly shown). In other words, the I/O unit 702 is configured to route communications between and among the various logical units of the parallel processing unit 720.

In an embodiment, a program executed by the host processor encodes a command stream in a buffer that provides workloads to the parallel processing unit 720 for processing. A workload may comprise several instructions and data to be processed by those instructions. The buffer is a region in a memory that is accessible (e.g., read/write) by both the host processor and the parallel processing unit 720. For example, the I/O unit 702 may be configured to access the buffer in a system memory connected to the interconnect 718 via memory requests transmitted over the interconnect 718. In an embodiment, the host processor writes the command stream to the buffer and then transmits a pointer to the start of the command stream to the parallel processing unit 720. The front-end unit 704 receives pointers to one or more command streams. The front-end unit 704 manages the one or more streams, reading commands from the streams and forwarding commands to the various units of the parallel processing unit 720.

The front-end unit 704 is coupled to a scheduler unit 708 that configures the various general processing cluster 800 modules to process tasks defined by the one or more streams. The scheduler unit 708 is configured to track state information related to the various tasks managed by the scheduler unit 708. The state may indicate which general processing cluster 800 a task is assigned to, whether the task is active or inactive, a priority level associated with the task, and so forth. The scheduler unit 708 manages the execution of a plurality of tasks on the one or more general processing cluster 800 modules.

The scheduler unit 708 is coupled to a work distribution unit 710 that is configured to dispatch tasks for execution on the general processing cluster 800 modules. The work distribution unit 710 may track a number of scheduled tasks received from the scheduler unit 708. In an embodiment, the work distribution unit 710 manages a pending task pool and an active task pool for each of the general processing cluster 800 modules. The pending task pool may comprise a number of slots (e.g., 32 slots) that contain tasks assigned to be processed by a particular general processing cluster 800. The active task pool may comprise a number of slots (e.g., 4 slots) for tasks that are actively being processed by the general processing cluster 800 modules. As a general processing cluster 800 finishes the execution of a task, that task is evicted from the active task pool for the general processing cluster 800 and one of the other tasks from the pending task pool is selected and scheduled for execution on the general processing cluster 800. If an active task has been idle on the general processing cluster 800, such as while waiting for a data dependency to be resolved, then the active task may be evicted from the general processing cluster 800 and returned to the pending task pool while another task in the pending task pool is selected and scheduled for execution on the general processing cluster 800.

The work distribution unit 710 communicates with the one or more general processing cluster 800 modules via crossbar 714. The crossbar 714 is an interconnect network that couples many of the units of the parallel processing unit 720 to other units of the parallel processing unit 720. For example, the crossbar 714 may be configured to couple the work distribution unit 710 to a particular general processing cluster 800. Although not shown explicitly, one or more other units of the parallel processing unit 720 may also be connected to the crossbar 714 via the hub 706.

The tasks are managed by the scheduler unit 708 and dispatched to a general processing cluster 800 by the work distribution unit 710. The general processing cluster 800 is configured to process the task and generate results. The results may be consumed by other tasks within the general processing cluster 800, routed to a different general processing cluster 800 via the crossbar 714, or stored in the memory 712. The results can be written to the memory 712 via the memory partition unit 900 modules, which implement a memory interface for reading and writing data to/from the memory 712. The results can be transmitted to another parallel processing unit 720 or CPU via the NVLink 716. In an embodiment, the parallel processing unit 720 includes a number U of memory partition unit 900 modules that is equal to the number of separate and distinct memory 712 devices coupled to the parallel processing unit 720. A memory partition unit 900 will be described in more detail below in conjunction with FIG. 9.

In an embodiment, a host processor executes a driver kernel that implements an application programming interface (API) that enables one or more applications executing on the host processor to schedule operations for execution on the parallel processing unit 720. In an embodiment, multiple compute applications are simultaneously executed by the parallel processing unit 720 and the parallel processing unit 720 provides isolation, quality of service (QoS), and independent address spaces for the multiple compute applications. An application may generate instructions (e.g., API calls) that cause the driver kernel to generate one or more tasks for execution by the parallel processing unit 720. The driver kernel outputs tasks to one or more streams being processed by the parallel processing unit 720. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 10.

Figure 8:
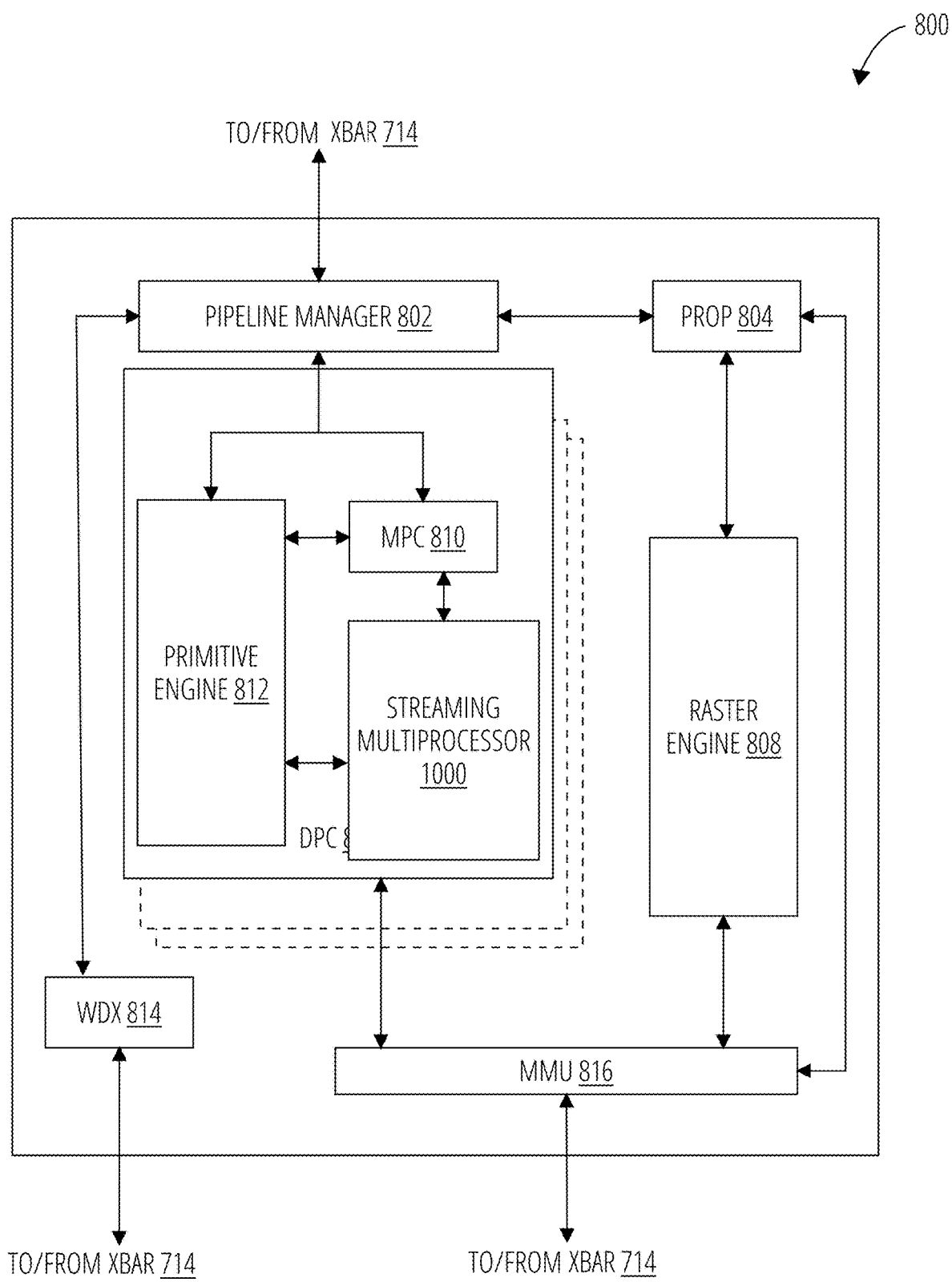
FIG. 8 depicts a general processing cluster 800 in accordance with one embodiment.

FIG. 8 depicts a general processing cluster 800 of the parallel processing unit 720 of FIG. 7, in accordance with an embodiment. As shown in FIG. 8, each general processing cluster 800 includes a number of hardware units for processing tasks. In an embodiment, each general processing cluster 800 includes a pipeline manager 802, a pre-raster operations unit 804, a raster engine 808, a work distribution crossbar 814, a memory management unit 816, and one or more data processing cluster 806. It will be appreciated that the general processing cluster 800 of FIG. 8 may include other hardware units in lieu of or in addition to the units shown in FIG. 8.

In an embodiment, the operation of the general processing cluster 800 is controlled by the pipeline manager 802. The pipeline manager 802 manages the configuration of the one or more data processing cluster 806 modules for processing tasks allocated to the general processing cluster 800. In an embodiment, the pipeline manager 802 may configure at least one of the one or more data processing cluster 806 modules to implement at least a portion of a graphics rendering pipeline. For example, a data processing cluster 806 may be configured to execute a vertex shader program on the programmable streaming multiprocessor 1000. The pipeline manager 802 may also be configured to route packets received from the work distribution unit 710 to the appropriate logical units within the general processing cluster 800. For example, some packets may be routed to fixed function hardware units in the pre-raster operations unit 804 and/or raster engine 808 while other packets may be routed to the data processing cluster 806 modules for processing by the primitive engine 812 or the streaming multiprocessor 1000. In an embodiment, the pipeline manager 802 may configure at least one of the one or more data processing cluster 806 modules to implement a neural network model and/or a computing pipeline.

Figure 9:
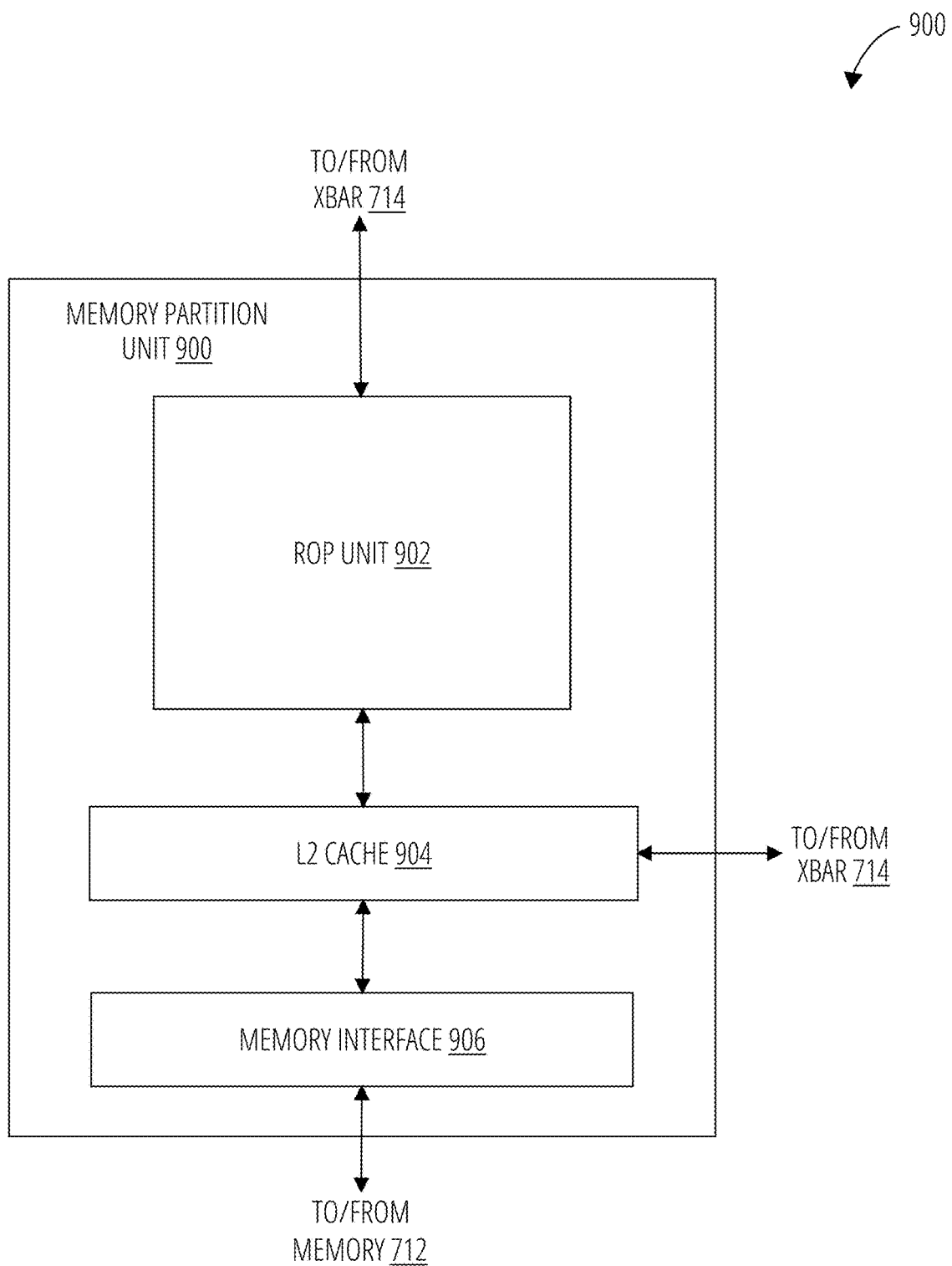
FIG. 9 depicts a memory partition unit 900 in accordance with one embodiment.

The pre-raster operations unit 804 is configured to route data generated by the raster engine 808 and the data processing cluster 806 modules to a Raster Operations (ROP) unit, described in more detail in conjunction with FIG. 9. The pre-raster operations unit 804 may also be configured to perform optimizations for color blending, organize pixel data, perform address translations, and the like.

The raster engine 808 includes a number of fixed function hardware units configured to perform various raster operations. In an embodiment, the raster engine 808 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 808 comprises fragments to be processed, for example, by a fragment shader implemented within a data processing cluster 806.

Each data processing cluster 806 included in the general processing cluster 800 includes an M-pipe controller 810, a primitive engine 812, and one or more streaming multiprocessor 1000 modules. The M-pipe controller 810 controls the operation of the data processing cluster 806, routing packets received from the pipeline manager 802 to the appropriate units in the data processing cluster 806. For example, packets associated with a vertex may be routed to the primitive engine 812, which is configured to fetch vertex attributes associated with the vertex from the memory 712. In contrast, packets associated with a shader program may be transmitted to the streaming multiprocessor 1000.

The streaming multiprocessor 1000 comprises a programmable streaming processor that is configured to process tasks represented by a number of threads. Each streaming multiprocessor 1000 is multi-threaded and configured to execute a plurality of threads (e.g., 32 threads) from a particular group of threads concurrently. In an embodiment, the streaming multiprocessor 1000 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1000 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1000 will be described in more detail below in conjunction with FIG. 10.

The memory management unit 816 provides an interface between the general processing cluster 800 and the memory partition unit 900. The memory management unit 816 may provide translation of virtual addresses into physical addresses, memory protection, and arbitration of memory requests. In an embodiment, the memory management unit 816 provides one or more translation lookaside buffers (TLBs) for performing translation of virtual addresses into physical addresses in the memory 712.

FIG. 9 depicts a memory partition unit 900 of the parallel processing unit 720 of FIG. 7, in accordance with an embodiment. As shown in FIG. 9, the memory partition unit 900 includes a raster operations unit 902, a level two cache 904, and a memory interface 906. The memory interface 906 is coupled to the memory 712. Memory interface 906 may implement 32, 64, 128, 1024-bit data buses, or the like, for high-speed data transfer. In an embodiment, the parallel processing unit 720 incorporates U memory interface 906 modules, one memory interface 906 per pair of memory partition unit 900 modules, where each pair of memory partition unit 900 modules is connected to a corresponding memory 712 device. For example, parallel processing unit 720 may be connected to up to Y memory 712 devices, such as high bandwidth memory stacks or graphics double-data-rate, version 5, synchronous dynamic random access memory, or other types of persistent storage.

In an embodiment, the memory interface 906 implements an HBM2 memory interface and Y equals half U. In an embodiment, the HBM2 memory stacks are located on the same physical package as the parallel processing unit 720, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 712 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 720 modules process very large datasets and/or run applications for extended periods.

In an embodiment, the parallel processing unit 720 implements a multi-level memory hierarchy. In an embodiment, the memory partition unit 900 supports a unified memory to provide a single unified virtual address space for CPU and parallel processing unit 720 memory, enabling data sharing between virtual memory systems. In an embodiment the frequency of accesses by a parallel processing unit 720 to memory located on other processors is traced to ensure that memory pages are moved to the physical memory of the parallel processing unit 720 that is accessing the pages more frequently. In an embodiment, the NVLink 716 supports address translation services allowing the parallel processing unit 720 to directly access a CPU's page tables and providing full access to CPU memory by the parallel processing unit 720.

In an embodiment, copy engines transfer data between multiple parallel processing unit 720 modules or between parallel processing unit 720 modules and CPUs. The copy engines can generate page faults for addresses that are not mapped into the page tables. The memory partition unit 900 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 712 or other system memory may be fetched by the memory partition unit 900 and stored in the level two cache 904, which is located on-chip and is shared between the various general processing cluster 800 modules. As shown, each memory partition unit 900 includes a portion of the level two cache 904 associated with a corresponding memory 712 device. Lower level caches may then be implemented in various units within the general processing cluster 800 modules. For example, each of the streaming multiprocessor 1000 modules may implement an L1 cache. The L1 cache is private memory that is dedicated to a particular streaming multiprocessor 1000. Data from the level two cache 904 may be fetched and stored in each of the L1 caches for processing in the functional units of the streaming multiprocessor 1000 modules. The level two cache 904 is coupled to the memory interface 906 and the crossbar 714.

The raster operations unit 902 performs graphics raster operations related to pixel color, such as color compression, pixel blending, and the like. The raster operations unit 902 also implements depth testing in conjunction with the raster engine 808, receiving a depth for a sample location associated with a pixel fragment from the culling engine of the raster engine 808. The depth is tested against a corresponding depth in a depth buffer for a sample location associated with the fragment. If the fragment passes the depth test for the sample location, then the raster operations unit 902 updates the depth buffer and transmits a result of the depth test to the raster engine 808. It will be appreciated that the number of partition memory partition unit 900 modules may be different than the number of general processing cluster 800 modules and, therefore, each raster operations unit 902 may be coupled to each of the general processing cluster 800 modules. The raster operations unit 902 tracks packets received from the different general processing cluster 800 modules and determines which general processing cluster 800 that a result generated by the raster operations unit 902 is routed to through the crossbar 714. Although the raster operations unit 902 is included within the memory partition unit 900 in FIG. 9, in other embodiment, the raster operations unit 902 may be outside of the memory partition unit 900. For example, the raster operations unit 902 may reside in the general processing cluster 800 or another unit.

Figure 10:
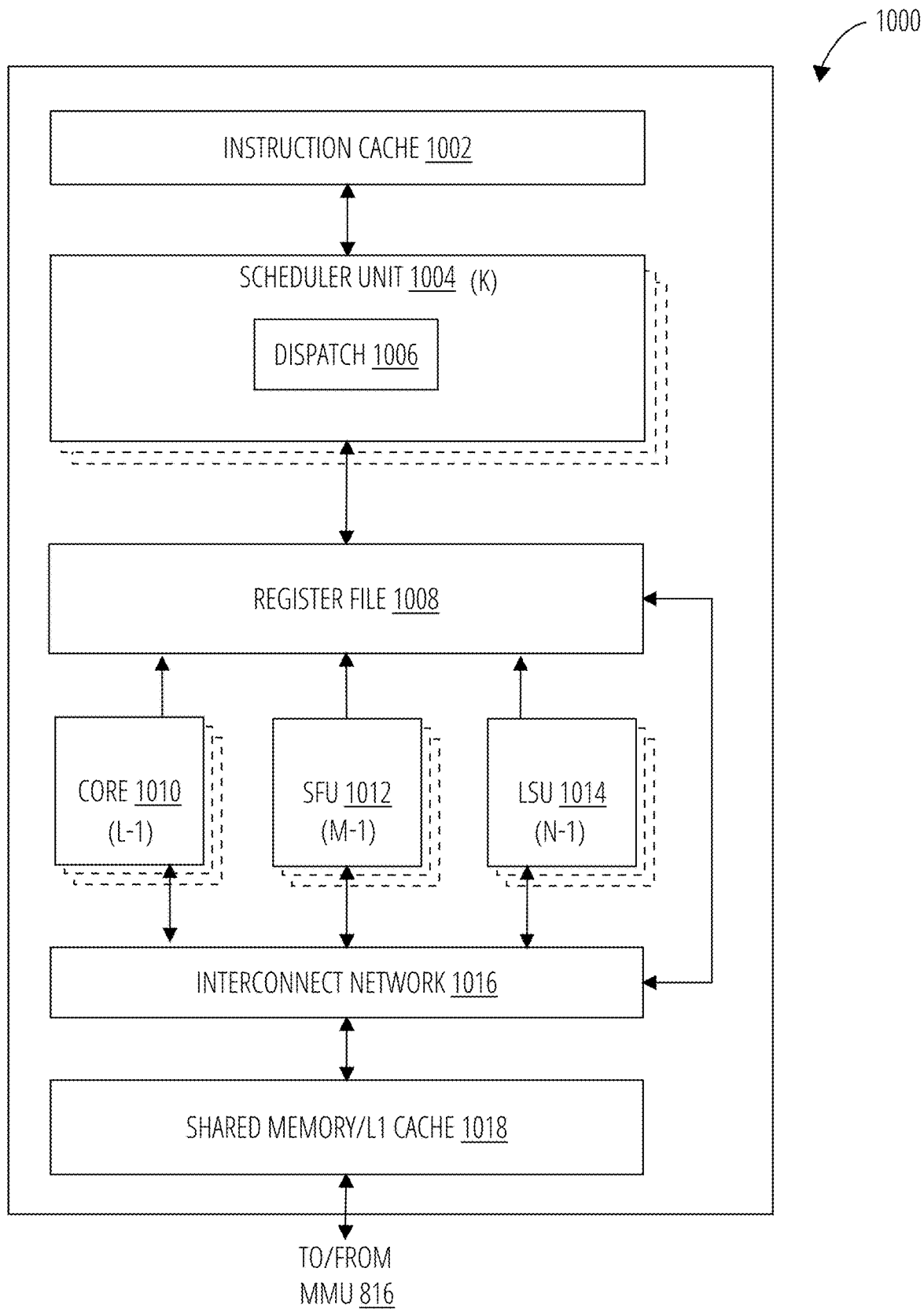
FIG. 10 depicts a streaming multiprocessor 1000 in accordance with one embodiment.

FIG. 10 illustrates the streaming multiprocessor 1000 of FIG. 8, in accordance with an embodiment. As shown in FIG. 10, the streaming multiprocessor 1000 includes an instruction cache 1002, one or more scheduler unit 1004 modules (e.g., such as scheduler unit 708), a register file 1008, one or more processing core 1010 modules, one or more special function unit 1012 modules, one or more load/store unit 1014 modules, an interconnect network 1016, and a shared memory/L1 cache 1018.

As described above, the work distribution unit 710 dispatches tasks for execution on the general processing cluster 800 modules of the parallel processing unit 720. The tasks are allocated to a particular data processing cluster 806 within a general processing cluster 800 and, if the task is associated with a shader program, the task may be allocated to a streaming multiprocessor 1000. The scheduler unit 708 receives the tasks from the work distribution unit 710 and manages instruction scheduling for one or more thread blocks assigned to the streaming multiprocessor 1000. The scheduler unit 1004 schedules thread blocks for execution as warps of parallel threads, where each thread block is allocated at least one warp. In an embodiment, each warp executes 32 threads. The scheduler unit 1004 may manage a plurality of different thread blocks, allocating the warps to the different thread blocks and then dispatching instructions from the plurality of different cooperative groups to the various functional units (e.g., core 1010 modules, special function unit 1012 modules, and load/store unit 1014 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads ( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1006 unit is configured within the scheduler unit 1004 to transmit instructions to one or more of the functional units. In one embodiment, the scheduler unit 1004 includes two dispatch 1006 units that enable two different instructions from the same warp to be dispatched during each clock cycle. In alternative embodiments, each scheduler unit 1004 may include a single dispatch 1006 unit or additional dispatch 1006 units.

Each streaming multiprocessor 1000 includes a register file 1008 that provides a set of registers for the functional units of the streaming multiprocessor 1000. In an embodiment, the register file 1008 is divided between each of the functional units such that each functional unit is allocated a dedicated portion of the register file 1008. In another embodiment, the register file 1008 is divided between the different warps being executed by the streaming multiprocessor 1000. The register file 1008 provides temporary storage for operands connected to the data paths of the functional units.

Each streaming multiprocessor 1000 comprises L processing core 1010 modules. In an embodiment, the streaming multiprocessor 1000 includes a large number (e.g., 128, etc.) of distinct processing core 1010 modules. Each core 1010 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1010 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1010 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1000 also comprises M special function unit 1012 modules that perform special functions (e.g., attribute evaluation, reciprocal square root, and the like). In an embodiment, the special function unit 1012 modules may include a tree traversal unit configured to traverse a hierarchical tree data structure. In an embodiment, the special function unit 1012 modules may include texture unit configured to perform texture map filtering operations. In an embodiment, the texture units are configured to load texture maps (e.g., a 2D array of texels) from the memory 712 and sample the texture maps to produce sampled texture values for use in shader programs executed by the streaming multiprocessor 1000. In an embodiment, the texture maps are stored in the shared memory/L1 cache 1018. The texture units implement texture operations such as filtering operations using mip-maps (e.g., texture maps of varying levels of detail). In an embodiment, each streaming multiprocessor 1000 includes two texture units.

Each streaming multiprocessor 1000 also comprises N load/store unit 1014 modules that implement load and store operations between the shared memory/L1 cache 1018 and the register file 1008. Each streaming multiprocessor 1000 includes an interconnect network 1016 that connects each of the functional units to the register file 1008 and the load/store unit 1014 to the register file 1008 and shared memory/L1 cache 1018. In an embodiment, the interconnect network 1016 is a crossbar that can be configured to connect any of the functional units to any of the registers in the register file 1008 and connect the load/store unit 1014 modules to the register file 1008 and memory locations in shared memory/L1 cache 1018.

The shared memory/L1 cache 1018 is an array of on-chip memory that allows for data storage and communication between the streaming multiprocessor 1000 and the primitive engine 812 and between threads in the streaming multiprocessor 1000. In an embodiment, the shared memory/L1 cache 1018 comprises 128 KB of storage capacity and is in the path from the streaming multiprocessor 1000 to the memory partition unit 900. The shared memory/L1 cache 1018 can be used to cache reads and writes. One or more of the shared memory/L1 cache 1018, level two cache 904, and memory 712 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1018 enables the shared memory/L1 cache 1018 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 7, are bypassed, creating a much simpler programming model. In the general purpose parallel computation configuration, the work distribution unit 710 assigns and distributes blocks of threads directly to the data processing cluster 806 modules. The threads in a block execute the same program, using a unique thread ID in the calculation to ensure each thread generates unique results, using the streaming multiprocessor 1000 to execute the program and perform calculations, shared memory/L1 cache 1018 to communicate between threads, and the load/store unit 1014 to read and write global memory through the shared memory/L1 cache 1018 and the memory partition unit 900. When configured for general purpose parallel computation, the streaming multiprocessor 1000 can also write commands that the scheduler unit 708 can use to launch new work on the data processing cluster 806 modules.

The parallel processing unit 720 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 720 is embodied on a single semiconductor substrate. In another embodiment, the parallel processing unit 720 is included in a system-on-a-chip (SoC) along with one or more other devices such as additional parallel processing unit 720 modules, the memory 712, a reduced instruction set computer (RISC) CPU, a memory management unit (MMU), a digital-to-analog converter (DAC), and the like.

In an embodiment, the parallel processing unit 720 may be included on a graphics card that includes one or more memory devices. The graphics card may be configured to interface with a PCIe slot on a motherboard of a desktop computer. In yet another embodiment, the parallel processing unit 720 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 11:
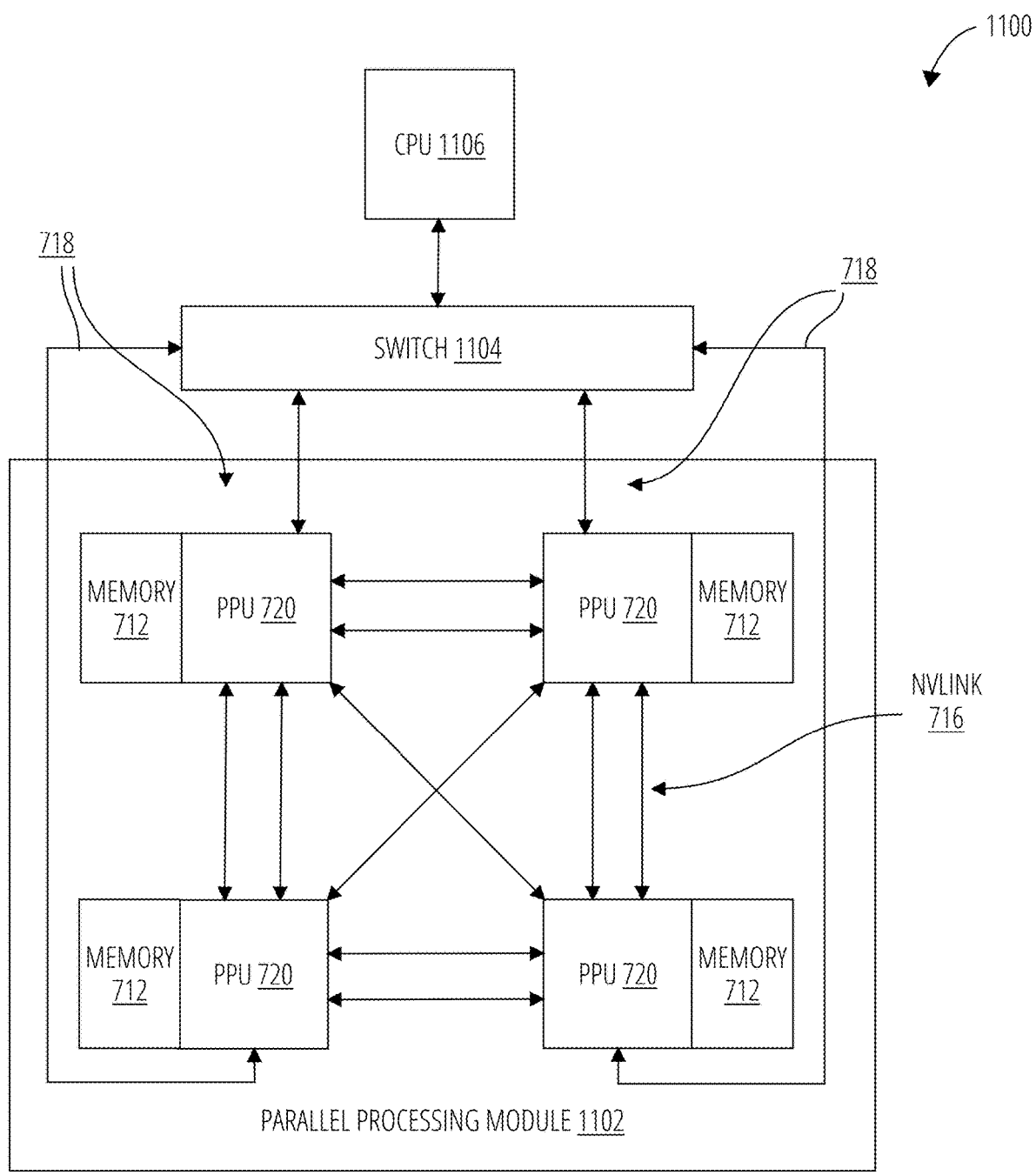
FIG. 11 depicts a processing system 1100 in accordance with one embodiment.

FIG. 11 is a conceptual diagram of a processing system 1100 implemented using the parallel processing unit 720 of FIG. 7, in accordance with an embodiment. The processing system 1100 includes a central processing unit 1106, switch 1104, and multiple parallel processing unit 720 modules each and respective memory 712 modules. The NVLink 716 provides high-speed communication links between each of the parallel processing unit 720 modules. Although a particular number of NVLink 716 and interconnect 718 connections are illustrated in FIG. 11, the number of connections to each parallel processing unit 720 and the central processing unit 1106 may vary. The switch 1104 interfaces between the interconnect 718 and the central processing unit 1106. The parallel processing unit 720 modules, memory 712 modules, and NVLink 716 connections may be situated on a single semiconductor platform to form a parallel processing module 1102. In an embodiment, the switch 1104 supports two or more protocols to interface between various different connections and/or links.

In another embodiment (not shown), the NVLink 716 provides one or more high-speed communication links between each of the parallel processing unit modules (parallel processing unit 720, parallel processing unit 720, parallel processing unit 720, and parallel processing unit 720) and the central processing unit 1106 and the switch 1104 interfaces between the interconnect 718 and each of the parallel processing unit modules. The parallel processing unit modules, memory 712 modules, and interconnect 718 may be situated on a single semiconductor platform to form a parallel processing module 1102. In yet another embodiment (not shown), the interconnect 718 provides one or more communication links between each of the parallel processing unit modules and the central processing unit 1106 and the switch 1104 interfaces between each of the parallel processing unit modules using the NVLink 716 to provide one or more high-speed communication links between the parallel processing unit modules. In another embodiment (not shown), the NVLink 716 provides one or more high-speed communication links between the parallel processing unit modules and the central processing unit 1106 through the switch 1104. In yet another embodiment (not shown), the interconnect 718 provides one or more communication links between each of the parallel processing unit modules directly. One or more of the NVLink 716 high-speed communication links may be implemented as a physical NVLink interconnect or either an on-chip or on-die interconnect using the same protocol as the NVLink 716.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1102 may be implemented as a circuit board substrate and each of the parallel processing unit modules and/or memory 712 modules may be packaged devices. In an embodiment, the central processing unit 1106, switch 1104, and the parallel processing module 1102 are situated on a single semiconductor platform.

In an embodiment, the signaling rate of each NVLink 716 is 20 to 25 Gigabits/second and each parallel processing unit module includes six NVLink 716 interfaces (as shown in FIG. 11, five NVLink 716 interfaces are included for each parallel processing unit module). Each NVLink 716 provides a data transfer rate of 25 Gigabytes/second in each direction, with six links providing 300 Gigabytes/second. The NVLink 716 can be used exclusively for PPU-to-PPU communication as shown in FIG. 11, or some combination of PPU-to-PPU and PPU-to-CPU, when the central processing unit 1106 also includes one or more NVLink 716 interfaces.

In an embodiment, the NVLink 716 allows direct load/store/atomic access from the central processing unit 1106 to each parallel processing unit module's memory 712. In an embodiment, the NVLink 716 supports coherency operations, allowing data read from the memory 712 modules to be stored in the cache hierarchy of the central processing unit 1106, reducing cache access latency for the central processing unit 1106. In an embodiment, the NVLink 716 includes support for Address Translation Services (ATS), enabling the parallel processing unit module to directly access page tables within the central processing unit 1106. One or more of the NVLink 716 may also be configured to operate in a low-power mode.

Figure 12:
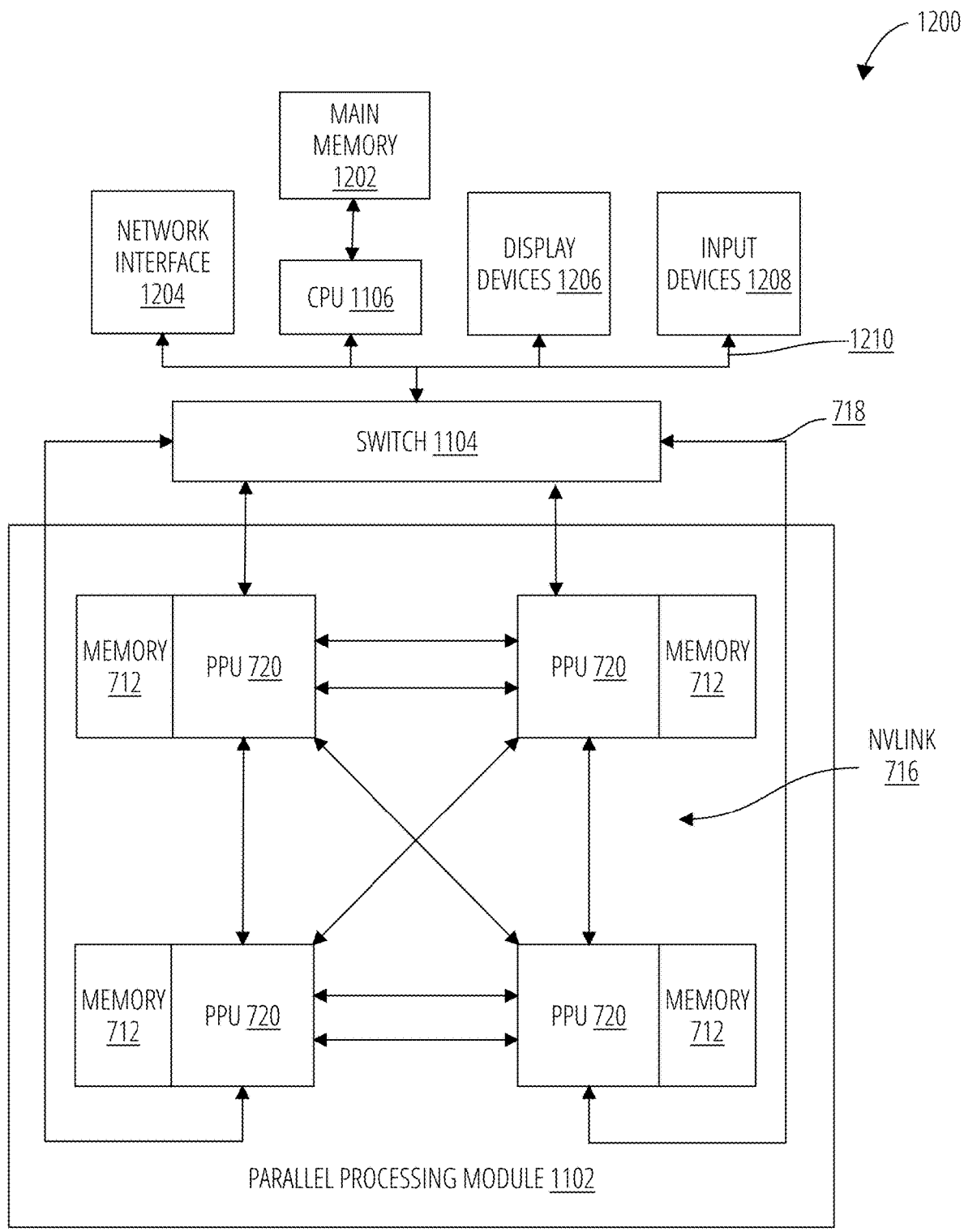
FIG. 12 depicts an exemplary processing system 1200 in accordance with another embodiment.

FIG. 12 depicts an exemplary processing system 1200 in which the various architecture and/or functionality of the various previous embodiments may be implemented. As shown, an exemplary processing system 1200 is provided including at least one central processing unit 1106 that is connected to a communications bus 1210. The communications bus 1210 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1200 also includes a main memory 1202. Control logic (software) and data are stored in the main memory 1202 which may take the form of random access memory (RAM).

The exemplary processing system 1200 also includes input devices 1208, the parallel processing module 1102, and display devices 1206, e.g. a conventional CRT (cathode ray tube), LCD (liquid crystal display), LED (light emitting diode), plasma display or the like. User input may be received from the input devices 1208, e.g., keyboard, mouse, touchpad, microphone, and the like. Each of the foregoing modules and/or devices may even be situated on a single semiconductor platform to form the exemplary processing system 1200. Alternately, the various modules may also be situated separately or in various combinations of semiconductor platforms per the desires of the user.

Further, the exemplary processing system 1200 may be coupled to a network (e.g., a telecommunications network, local area network (LAN), wireless network, wide area network (WAN) such as the Internet, peer-to-peer network, cable network, or the like) through a network interface 1204 for communication purposes.

The exemplary processing system 1200 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1202 and/or the secondary storage. Such computer programs, when executed, enable the exemplary processing system 1200 to perform various functions. The main memory 1202, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1200 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

Figure 13:
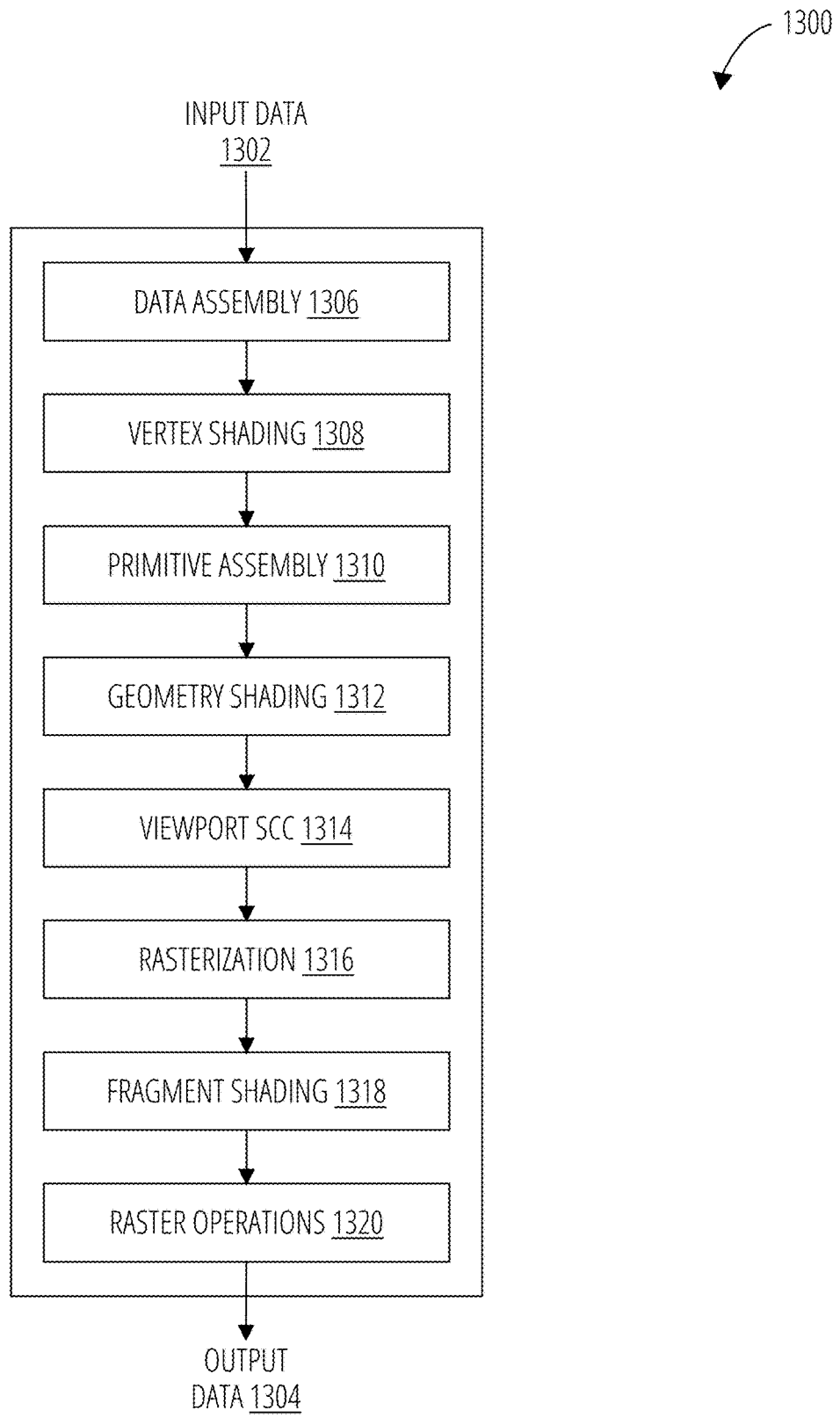
FIG. 13 depicts a graphics processing pipeline 1300 in accordance with one embodiment.

FIG. 13 is a conceptual diagram of a graphics processing pipeline 1300 implemented by the parallel processing unit 720 of FIG. 7, in accordance with an embodiment. In an embodiment, the parallel processing unit 720 comprises a graphics processing unit (GPU). The parallel processing unit 720 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 720 can be configured to process the graphics primitives to generate a frame buffer (e.g., pixel data for each of the pixels of the display).

An application writes model data for a scene (e.g., a collection of vertices and attributes) to a memory such as a system memory or memory 712. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1000 modules of the parallel processing unit 720 including one or more of a vertex shader, hull shader, domain shader, geometry shader, and a pixel shader. For example, one or more of the streaming multiprocessor 1000 modules may be configured to execute a vertex shader program that processes a number of vertices defined by the model data. In an embodiment, the different streaming multiprocessor 1000 modules may be configured to execute different shader programs concurrently. For example, a first subset of streaming multiprocessor 1000 modules may be configured to execute a vertex shader program while a second subset of streaming multiprocessor 1000 modules may be configured to execute a pixel shader program. The first subset of streaming multiprocessor 1000 modules processes vertex data to produce processed vertex data and writes the processed vertex data to the level two cache 904 and/or the memory 712. After the processed vertex data is rasterized (e.g., transformed from three-dimensional data into two-dimensional data in screen space) to produce fragment data, the second subset of streaming multiprocessor 1000 modules executes a pixel shader to produce processed fragment data, which is then blended with other processed fragment data and written to the frame buffer in memory 712. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1300 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1300 receives input data 601 that is transmitted from one stage to the next stage of the graphics processing pipeline 1300 to generate output data 1304. In an embodiment, the graphics processing pipeline 1300 may represent a graphics processing pipeline defined by the OpenGL® API. As an option, the graphics processing pipeline 1300 may be implemented in the context of the functionality and architecture of the previous Figures and/or any subsequent Figure(s).

As shown in FIG. 13, the graphics processing pipeline 1300 comprises a pipeline architecture that includes a number of stages. The stages include, but are not limited to, a data assembly 1306 stage, a vertex shading 1308 stage, a primitive assembly 1310 stage, a geometry shading 1312 stage, a viewport SCC 1314 stage, a rasterization 1316 stage, a fragment shading 1318 stage, and a raster operations 1320 stage. In an embodiment, the input data 1302 comprises commands that configure the processing units to implement the stages of the graphics processing pipeline 1300 and geometric primitives (e.g., points, lines, triangles, quads, triangle strips or fans, etc.) to be processed by the stages. The output data 1304 may comprise pixel data (e.g., color data) that is copied into a frame buffer or other type of surface data structure in a memory.

The data assembly 1306 stage receives the input data 1302 that specifies vertex data for high-order surfaces, primitives, or the like. The data assembly 1306 stage collects the vertex data in a temporary storage or queue, such as by receiving a command from the host processor that includes a pointer to a buffer in memory and reading the vertex data from the buffer. The vertex data is then transmitted to the vertex shading 1308 stage for processing.

The vertex shading 1308 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1308 stage may manipulate individual vertex attributes such as position, color, texture coordinates, and the like. In other words, the vertex shading 1308 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1308 stage generates transformed vertex data that is transmitted to the primitive assembly 1310 stage.

The primitive assembly 1310 stage collects vertices output by the vertex shading 1308 stage and groups the vertices into geometric primitives for processing by the geometry shading 1312 stage. For example, the primitive assembly 1310 stage may be configured to group every three consecutive vertices as a geometric primitive (e.g., a triangle) for transmission to the geometry shading 1312 stage. In some embodiments, specific vertices may be reused for consecutive geometric primitives (e.g., two consecutive triangles in a triangle strip may share two vertices). The primitive assembly 1310 stage transmits geometric primitives (e.g., a collection of associated vertices) to the geometry shading 1312 stage.

The geometry shading 1312 stage processes geometric primitives by performing a set of operations (e.g., a geometry shader or program) on the geometric primitives. Tessellation operations may generate one or more geometric primitives from each geometric primitive. In other words, the geometry shading 1312 stage may subdivide each geometric primitive into a finer mesh of two or more geometric primitives for processing by the rest of the graphics processing pipeline 1300. The geometry shading 1312 stage transmits geometric primitives to the viewport SCC 1314 stage.

In an embodiment, the graphics processing pipeline 1300 may operate within a streaming multiprocessor and the vertex shading 1308 stage, the primitive assembly 1310 stage, the geometry shading 1312 stage, the fragment shading 1318 stage, and/or hardware/software associated therewith, may sequentially perform processing operations. Once the sequential processing operations are complete, in an embodiment, the viewport SCC 1314 stage may utilize the data. In an embodiment, primitive data processed by one or more of the stages in the graphics processing pipeline 1300 may be written to a cache (e.g. L1 cache, a vertex cache, etc.). In this case, in an embodiment, the viewport SCC 1314 stage may access the data in the cache. In an embodiment, the viewport SCC 1314 stage and the rasterization 1316 stage are implemented as fixed function circuitry.

The viewport SCC 1314 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1316 stage.

The rasterization 1316 stage converts the 3D geometric primitives into 2D fragments (e.g. capable of being utilized for display, etc.). The rasterization 1316 stage may be configured to utilize the vertices of the geometric primitives to setup a set of plane equations from which various attributes can be interpolated. The rasterization 1316 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1316 stage generates fragment data (e.g., interpolated vertex attributes associated with a particular sample location for each covered pixel) that are transmitted to the fragment shading 1318 stage.

The fragment shading 1318 stage processes fragment data by performing a set of operations (e.g., a fragment shader or a program) on each of the fragments. The fragment shading 1318 stage may generate pixel data (e.g., color values) for the fragment such as by performing lighting operations or sampling texture maps using interpolated texture coordinates for the fragment. The fragment shading 1318 stage generates pixel data that is transmitted to the raster operations 1320 stage.

The raster operations 1320 stage may perform various operations on the pixel data such as performing alpha tests, stencil tests, and blending the pixel data with other pixel data corresponding to other fragments associated with the pixel. When the raster operations 1320 stage has finished processing the pixel data (e.g., the output data 1304), the pixel data may be written to a render target such as a frame buffer, a color buffer, or the like.

It will be appreciated that one or more additional stages may be included in the graphics processing pipeline 1300 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1312 stage). Other types of graphics processing pipelines are contemplated as being within the scope of the present disclosure. Furthermore, any of the stages of the graphics processing pipeline 1300 may be implemented by one or more dedicated hardware units within a graphics processor such as parallel processing unit 720. Other stages of the graphics processing pipeline 1300 may be implemented by programmable hardware units such as the streaming multiprocessor 1000 of the parallel processing unit 720.

The graphics processing pipeline 1300 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 720. The API provides an abstraction for a programmer that lets a programmer utilize specialized graphics hardware, such as the parallel processing unit 720, to generate the graphical data without requiring the programmer to utilize the specific instruction set for the parallel processing unit 720. The application may include an API call that is routed to the device driver for the parallel processing unit 720. The device driver interprets the API call and performs various operations to respond to the API call. In some instances, the device driver may perform operations by executing instructions on the CPU. In other instances, the device driver may perform operations, at least in part, by launching operations on the parallel processing unit 720 utilizing an input/output interface between the CPU and the parallel processing unit 720. In an embodiment, the device driver is configured to implement the graphics processing pipeline 1300 utilizing the hardware of the parallel processing unit 720.

Various programs may be executed within the parallel processing unit 720 in order to implement the various stages of the graphics processing pipeline 1300. For example, the device driver may launch a kernel on the parallel processing unit 720 to perform the vertex shading 1308 stage on one streaming multiprocessor 1000 (or multiple streaming multiprocessor 1000 modules). The device driver (or the initial kernel executed by the parallel processing unit 720) may also launch other kernels on the parallel processing unit 720 to perform other stages of the graphics processing pipeline 1300, such as the geometry shading 1312 stage and the fragment shading 1318 stage. In addition, some of the stages of the graphics processing pipeline 1300 may be implemented on fixed unit hardware such as a rasterizer or a data assembler implemented within the parallel processing unit 720. It will be appreciated that results from one kernel may be processed by one or more intervening fixed function hardware units before being processed by a subsequent kernel on a streaming multiprocessor 1000.

LISTING OF DRAWING ELEMENTS

- 202 ray tracer
- 204 image
- 206 importance map generator
- 208 importance map
- 210 sample count generator
- 212 sampler
- 300 block
- 302 block
- 304 block
- 306 block
- 308 block
- 400 block
- 402 block
- 404 block
- 406 block
- 408 block
- 600 gaming system
- 602 game server(s)
- 604 client device(s)
- 606 network(s)
- 608 CPU(s)
- 610 GPU(s)
- 612 rendering component
- 614 render capture component
- 616 encoder
- 618 communication interface
- 620 communication interface
- 622 decoder
- 624 display
- 626 input device(s)
- 702 I/O unit
- 704 front-end unit
- 706 hub
- 708 scheduler unit
- 710 work distribution unit
- 712 memory
- 714 crossbar
- 716 NVLink
- 718 interconnect
- 720 parallel processing unit
- 800 general processing cluster
- 802 pipeline manager
- 804 pre-raster operations unit
- 806 data processing cluster
- 808 raster engine
- 810 M-pipe controller
- 812 primitive engine
- 814 work distribution crossbar
- 816 memory management unit
- 900 memory partition unit
- 902 raster operations unit
- 904 level two cache
- 906 memory interface
- 1000 streaming multiprocessor
- 1002 instruction cache
- 1004 scheduler unit
- 1006 dispatch
- 1008 register file
- 1010 core
- 1012 special function unit
- 1014 load/store unit
- 1016 interconnect network
- 1018 shared memory/L1 cache
- 1100 processing system
- 1102 parallel processing module
- 1104 switch
- 1106 central processing unit
- 1200 exemplary processing system
- 1202 main memory
- 1204 network interface
- 1206 display devices
- 1208 input devices
- 1210 communications bus
- 1300 graphics processing pipeline
- 1302 input data
- 1304 output data
- 1306 data assembly
- 1308 vertex shading
- 1310 primitive assembly
- 1312 geometry shading
- 1314 viewport SCC
- 1316 rasterization
- 1318 fragment shading
- 1320 raster operations Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Logic symbols in the drawings should be understood to have their ordinary interpretation in the art in terms of functionality and various structures that may be utilized for their implementation, unless otherwise indicated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112 (f) for that claim element. Accordingly, claims in this application that do not otherwise include the "means for" [performing a function] construct should not be interpreted under 35 U.S.C § 112 (f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the intended invention as claimed. The scope of inventive subject matter is not limited to the depicted embodiments but is rather set forth in the following Claims.

What is claimed is:

1. A graphics rendering system comprising:
    a graphics display device;
    one or more processor; and
    logic to configure the processor to:
        form a first accumulation of importance values of pixels of an image for which ray trace sampling is not clamped (non-clamped pixels);
        form a second accumulation of waste importance of pixels of the image for which the ray trace sampling is clamped (clamped pixels);
        apply the first accumulation and the second accumulation to adapt an average per-pixel sample count of a ray tracer;
    forming a first ratio of (a) a sum of the first accumulation and the second accumulation, and (b) a total importance of the non-clamped pixels and the clamped pixels; and
    multiplying the first ratio by a total number of the pixels in the image.

2. A method comprising:
    forming a first accumulation of importance values of pixels in an image for which sampling by a ray tracer is not clamped (non-clamped pixels);
    forming a second accumulation of waste importance of pixels in the image for which sampling by the ray tracer is clamped (clamped pixels);
    applying the first accumulation and the second accumulation to set an average sample count for pixels in the image by forming a first ratio of (a) a sum of the first accumulation and the second accumulation, and (b) a total importance of the non-clamped pixels and the clamped pixels;
    multiplying the first ratio by a total number of the pixels in the image; and
    generating with the ray tracer a number of samples for each pixel of the plurality of pixels by applying the average sample count to a per-pixel importance setting.

3. The method of claim 2, further comprising:
forming a second ratio of (c) a total number of the pixels in the image, and (d) a number of the non-clamped pixels in the image; and
scaling the first ratio by the second ratio to form a third ratio.

4. The method of claim 3, further comprising:
scaling the third ratio by a difference between a previously configured average sample count and a configured minimum sample count.

5. The method of claim 2, wherein generating with the ray tracer the number of samples for each pixel comprises:
scaling an importance of each pixel by a first ratio of (a) a number of the non-clamped pixels in the image, and (b) the first accumulation.

6. The method of claim 5, further comprising:
scaling the first ratio by a difference between the average sample count and a configured minimum sample count to generate a second ratio; and
adding the configured minimum sample count to the second ratio.

7. The method of claim 2, further comprising:
generating a count of one of (a) a number of the clamped pixels in the image, and (b) a number of the non-clamped pixels in the image.

8. The method of claim 7, wherein the first accumulation, the second accumulation, and the count are each generated by a reduction of a different respective texture layer.

9. The method of claim 7, wherein the first accumulation, the second accumulation, and the count are each generated by a reduction of a same texture layer.

10. A non-volatile computer-readable medium comprising instructions that, when applied to one or more computer processor, implement a ray tracer comprising:
a ray generator configured with an average per-pixel sample count;
a sample count generator configured to:
form a first accumulation of importance values of pixels of the image for which sampling is not clamped (non-clamped pixels);
form a second accumulation of waste importance of pixels of the image for which sampling is clamped (clamped pixels);
scale an importance of each pixel by a first ratio of (a) a number of the non-clamped pixels in the image, and (b) the first accumulation; and
apply the first accumulation and the second accumulation to adapt the average per-pixel sample count of the ray generator.

11. The non-volatile computer-readable medium of claim 10, wherein the sample count generator is configured to form a second ratio of (a) a sum of the first accumulation and the second accumulation, and (b) a total importance of the non-clamped pixels and the clamped pixels.

12. The non-volatile computer-readable medium of claim 11, wherein the sample count generator is further configured to:
multiply the second ratio by a total number of the pixels in the image.

13. The non-volatile computer-readable medium of claim 11, wherein the sample count generator is further configured to:
form a third ratio of (c) a total number of the pixels in the image, and (d) a number of the non-clamped pixels in the image; and
scale the second ratio by the third ratio to form a fourth ratio.

14. The non-volatile computer-readable medium of claim 13, wherein the sample count generator is further configured to:
scale the fourth ratio by a difference between a previously configured average sample count and a configured minimum sample count.

15. The non-volatile computer-readable medium of claim 10, wherein the sample count generator is further configured to:
scale the first ratio by a difference between the average sample count and a configured minimum sample count to generate a second ratio; and
add the configured minimum sample count to a second ratio.

16. The non-volatile computer-readable medium of claim 10, wherein the sample count generator is further configured to:
generate a count of one of (a) a number of the clamped pixels in the image, and (b) a number of the non-clamped pixels in the image.

17. The non-volatile computer-readable medium of claim 16, wherein the sample count generator is further configured to generate the first accumulation, the second accumulation, and the count by a reduction of a different respective texture layer.

18. The non-volatile computer-readable medium of claim 16, wherein the sample count generator is further configured to generate the first accumulation, the second accumulation, and the count by a reduction of a same texture layer.

19. A method comprising:
forming a first accumulation of importance values of pixels in an image for which sampling by a ray tracer is not clamped (non-clamped pixels);
forming a second accumulation of waste importance of pixels in the image for which sampling by the ray tracer is clamped (clamped pixels);
applying the first accumulation and the second accumulation to set an average sample count for pixels in the image;
generating a count of one of (a) a number of the clamped pixels in the image, and (b) a number of the non-clamped pixels in the image;
wherein the first accumulation, the second accumulation, and the count are each generated by a reduction of a different respective texture layer; and
generating with the ray tracer a number of samples for each pixel of the plurality of pixels by applying the average sample count to a per-pixel importance setting.

20. A method comprising:
forming a first accumulation of importance values of pixels in an image for which sampling by a ray tracer is not clamped (non-clamped pixels);
forming a second accumulation of waste importance of pixels in the image for which sampling by the ray tracer is clamped (clamped pixels);
applying the first accumulation and the second accumulation to set an average sample count for pixels in the image;
generating a count of one of (a) a number of the clamped pixels in the image, and (b) a number of the non-clamped pixels in the image;
wherein the first accumulation, the second accumulation, and the count are each generated by a reduction of a same texture layer; and generating with the ray tracer a number of samples for each pixel of the plurality of pixels by applying the average sample count to a per-pixel importance setting.

* * * * *